(12) United States Patent
Ciccone et al.

(10) Patent No.: US 6,604,934 B2
(45) Date of Patent: *Aug. 12, 2003

(54) DUAL STAGE FLOATING RING MOLD EJECTION

(75) Inventors: Vince Ciccone, Kleinburg (CA); Jerko Knezovic, Brampton (CA)

(73) Assignee: Top Grade Molds Ltd., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,039

(22) Filed: Dec. 8, 1999

(65) Prior Publication Data
US 2002/0110615 A1 Aug. 15, 2002

(51) Int. Cl.[7] ............................................... B29C 45/40
(52) U.S. Cl. ........................ 425/556; 425/438; 425/441; 425/DIG. 58
(58) Field of Search ................................. 425/556, 441, 425/438, DIG. 58; 264/334, 318

(56) References Cited

U.S. PATENT DOCUMENTS

| | | | |
|---|---|---|---|
| 3,572,424 A | 3/1971 | Byrne | 164/347 |
| 3,905,740 A | 9/1975 | Lovejoy | 425/438 |
| 4,125,246 A | 11/1978 | von Holdt | 249/58 |
| 4,627,810 A | * 12/1986 | Von Holdt | 425/577 |
| 4,648,834 A | 3/1987 | von Holdt | 425/556 |
| 5,536,161 A | * 7/1996 | Smith | 425/438 |

* cited by examiner

Primary Examiner—Robert Davis
Assistant Examiner—Joseph S. Del Sole
(74) Attorney, Agent, or Firm—Barry R. Lipsitz; Douglas M. McAllister

(57) ABSTRACT

A plastic injection mold is disclosed for molding a cylindrical container having an enlarged annular rim and an annular flange spaced below the rim. The mold includes a core portion and a cavity portion which define therebetween the container to be molded. The core portion includes an inner, annular ejector ring defining a portion of the enlarged container rim. The core portion also includes an outer, annular ejector ring coaxially located adjacent to the inner ejector ring. Axially movable first push rods are connected to the inner ejector ring for moving both rings outwardly to partially eject a molded container upon opening of the mold. The core portion also includes cylinders and pistons connected to the outer ejector ring for separating and moving the outer ejector ring outwardly relative to the inner ejector ring to complete the ejection of the molded container from the mold core.

11 Claims, 6 Drawing Sheets

DUAL STAGE FLOATING RING MOLD EJECTION

FIELD OF THE INVENTION

This invention relates to plastic injection molds for molding containers having multiple peripheral flanges, and in particular, to means for stripping or ejecting the molded containers upon opening of the mold.

BACKGROUND TO THE INVENTION

Containers, such as buckets or pails often have an enlarged peripheral rim or lip and a second annular flange spaced below the rim for strengthening purposes, or for attaching a bail or handle to the container. A common way of molding such a container is to provide collets in the mold that open radially outwardly to release the container rim and flange and thus allow the container to be ejected or stripped from the mold core.

A difficulty with collet-type molds is that they are complex and have a lot of sliding components which are prone to wear problems.

An alternative approach which eliminates some of the difficulties of the collet-type molds is shown in U.S. Pat. No. 4,648,834 issued to John W. Von Holdt. In this Von Holdt patent, two axially movable concentric stripper rings are used. A first stripper ring molds the container rim and the second stripper ring engages the container flange. When the container is molded and the mold opens, the second ring is moved upwardly against the container flange to lift the container off the mold core. The first ring floats along with the container rim until the container rim shrinks inwardly upon cooling to release itself therefrom.

A difficulty with the above-mentioned Von Holdt structure, however, is that it depends upon the type of plastic and the molding parameters such as temperature, molding time, wall thicknesses, speed of withdrawal of the container from the mold, etc. in order to work properly. It is hard to control precisely all of these parameters.

SUMMARY OF THE INVENTION

The present invention is an improvement over the Von Holdt structure in that two driven concentric ejector rings are used to precisely eject the molded container without having to depend on shrinkage due to cooling for proper operation.

According to the invention, there is provided an injection mold comprising a core portion and a cavity portion defining therebetween a mold cavity in the shape of a container to be molded, the container having an enlarged annular rim and an annular flange spaced therefrom. An inner, annular ejector ring is located in the mold core portion. The inner ejector ring defines a portion of the enlarged annular rim. An outer, annular ejector ring is coaxially located adjacent to the inner ejector ring. The outer ejector ring defines a portion of the annular flange. Axially movable first push rod means is connected to the inner ejector ring for moving the inner ejector ring outwardly to partially eject a molded container from the mold core portion upon opening of the mold. Also, axially movable second push rod means is connected to the outer ejector ring for moving the outer ejector ring outwardly relative to the inner ejector ring to complete the ejection of the molded container from the mold core.

BRIEF DESCRIPTION OF THE DRAWINGS

Preferred embodiments of the invention will now be described, by way of example, with reference to the accompanying drawings, in which.

DETAILED DESCRIPTION OF PREFERRED EMBODIMENTS

Figure 1:
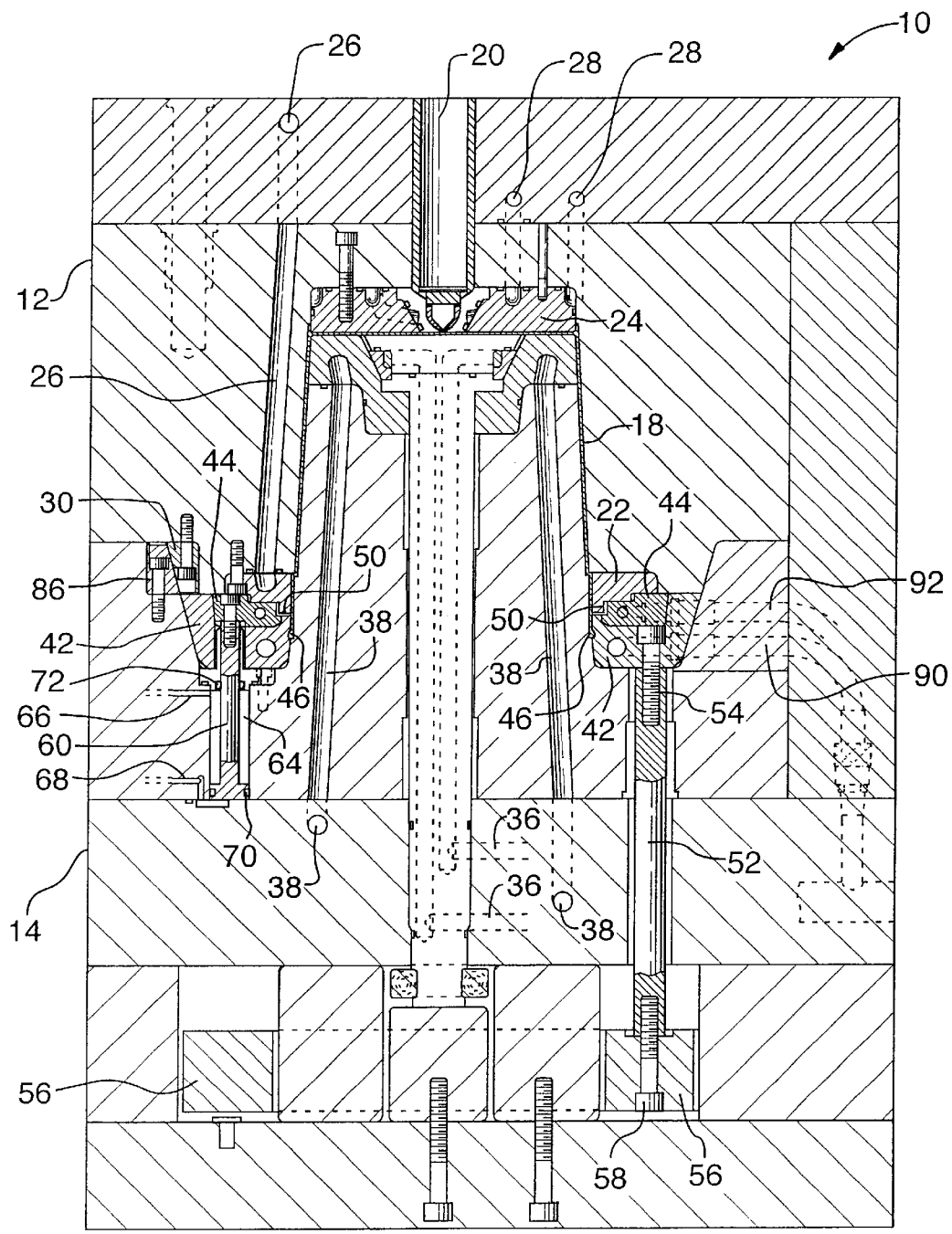
FIG. 1 is a diagrammatic, vertical, sectional view showing a preferred embodiment of an injection mold according to the present invention and as viewed along lines 1—1 of FIG. 6.
Figure 2:
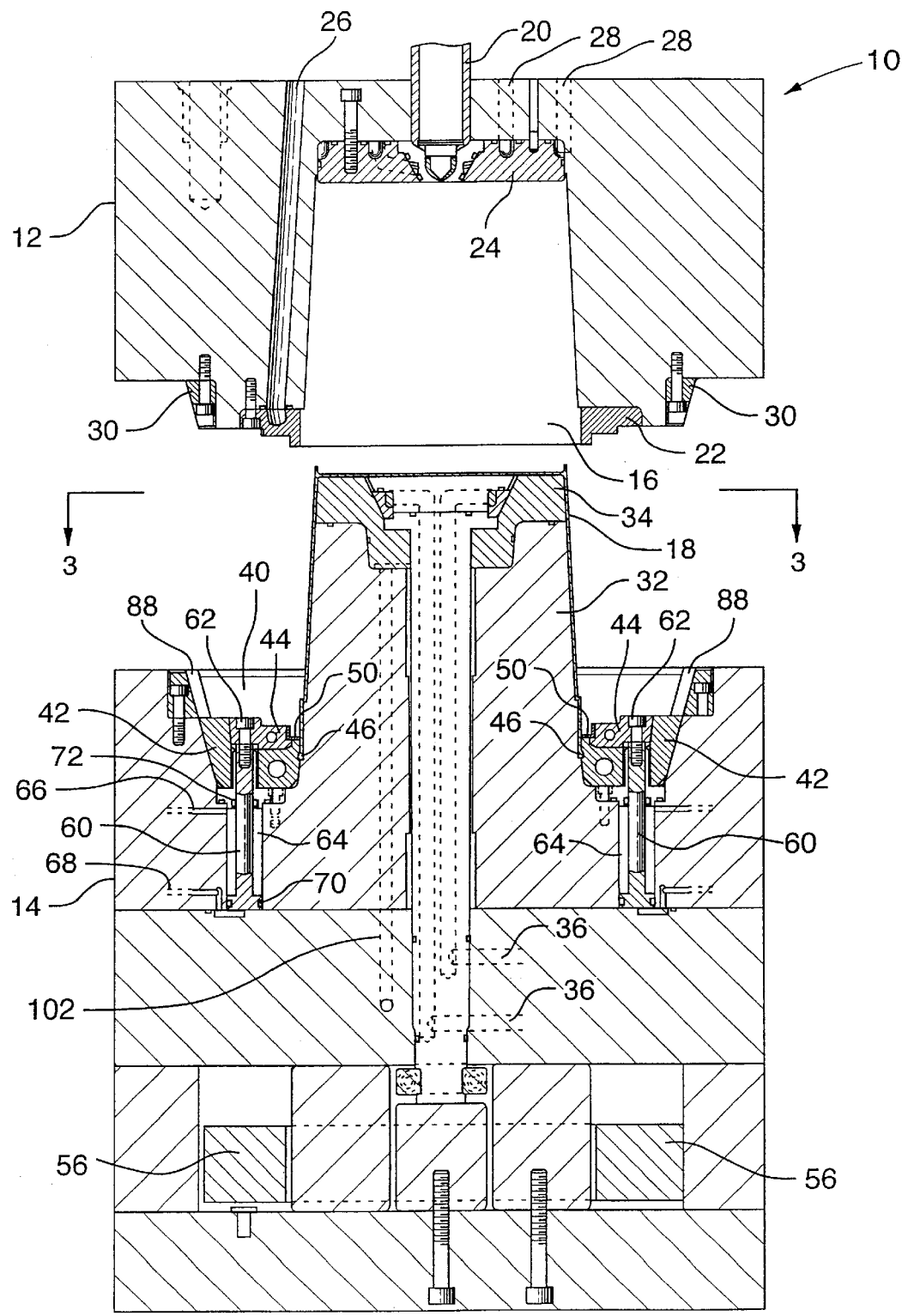
FIG. 2 is a vertical sectional view similar to FIG. 1 showing the mold core and cavity separated, but viewed along lines 2—2 of FIG. 6.
Figure 3:
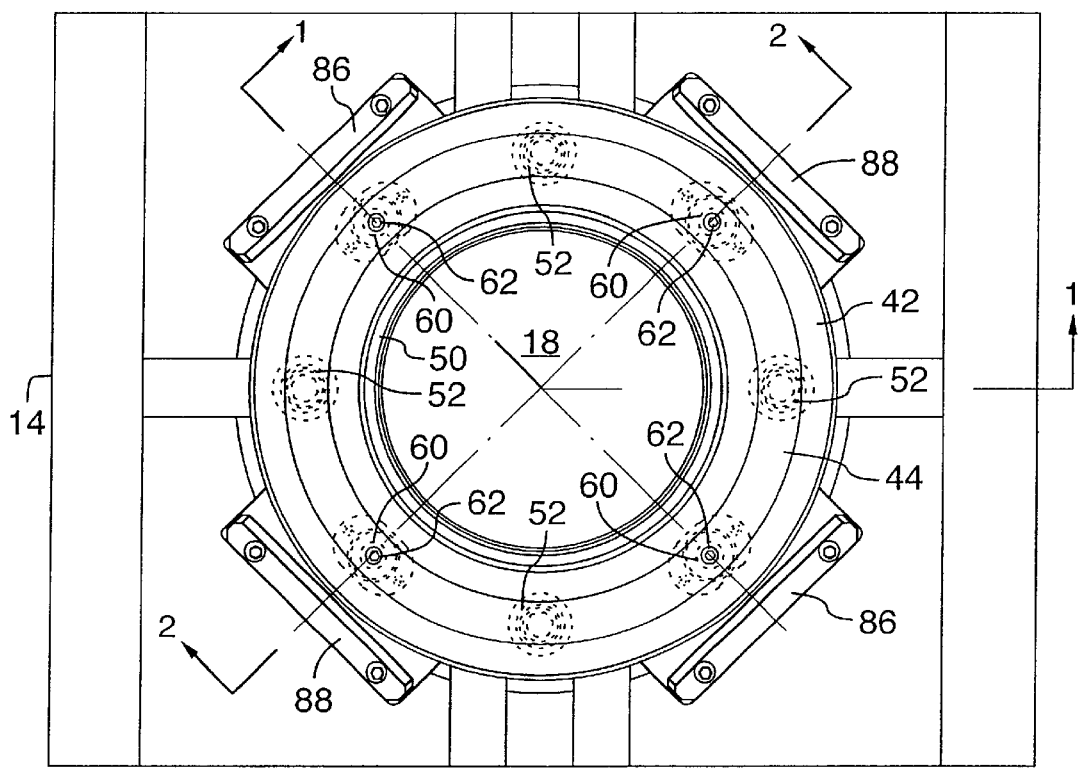
FIG. 3 is a plan view of the mold core as taken along lines 3—3 of FIG. 2.

Referring to FIGS. 1 to 3, a preferred embodiment of an ejection mold according to the present invention is generally indicated by reference 10. Injection mold 10 includes a cavity portion 12 and a core portion 14. Cavity portion 12 includes a cavity 16 defining the outer surface of a container 18 to be molded in injection mold 10. Cavity portion 12 also includes a sprue 20 for injecting molten plastic into injection mold 10. High heat conductivity inserts 22, 24 are provided in the usual manner for cooling the molded container, and appropriate cooling lines 26, 28 are provided for cooling the mold cavity. Mold clamping wedges 30 are also provided for locking cavity portion 12 to core portion 14, as will be described further below. The construction of cavity portion 12 is rather conventional and thus will not be described in greater detail herein.

Mold core portion 14 includes a central, axially disposed boss 32 which defines the inside surface of container 18. Boss 32 has a high heat conductivity top portion 34 and cooling water is supplied thereto through cooling lines 36,38. Again, the construction of boss portion 32 which defines the inside surface of container 18 is rather conventional, so will not be described in further detail herein.

Core portion 14 defines an annular trough 40 (see FIG. 2) located around the base of boss 32 in which are located an inner, annular stripper or ejector ring 42 and a concentric, outer, annular stripper or ejector ring 44 coaxially located adjacent to the inner ejector ring 42. Inner ejector ring 42 has an inwardly disposed annular groove 45 (see FIG. 5) that defines a portion of an enlarged annular rim 46 of container 18. Outer ejector ring 44 has an inner peripheral groove 48 (see FIGS. 4 and 5) that defines a portion of annular flange 50 on container 18 spaced from rim 46.

Figure 4:
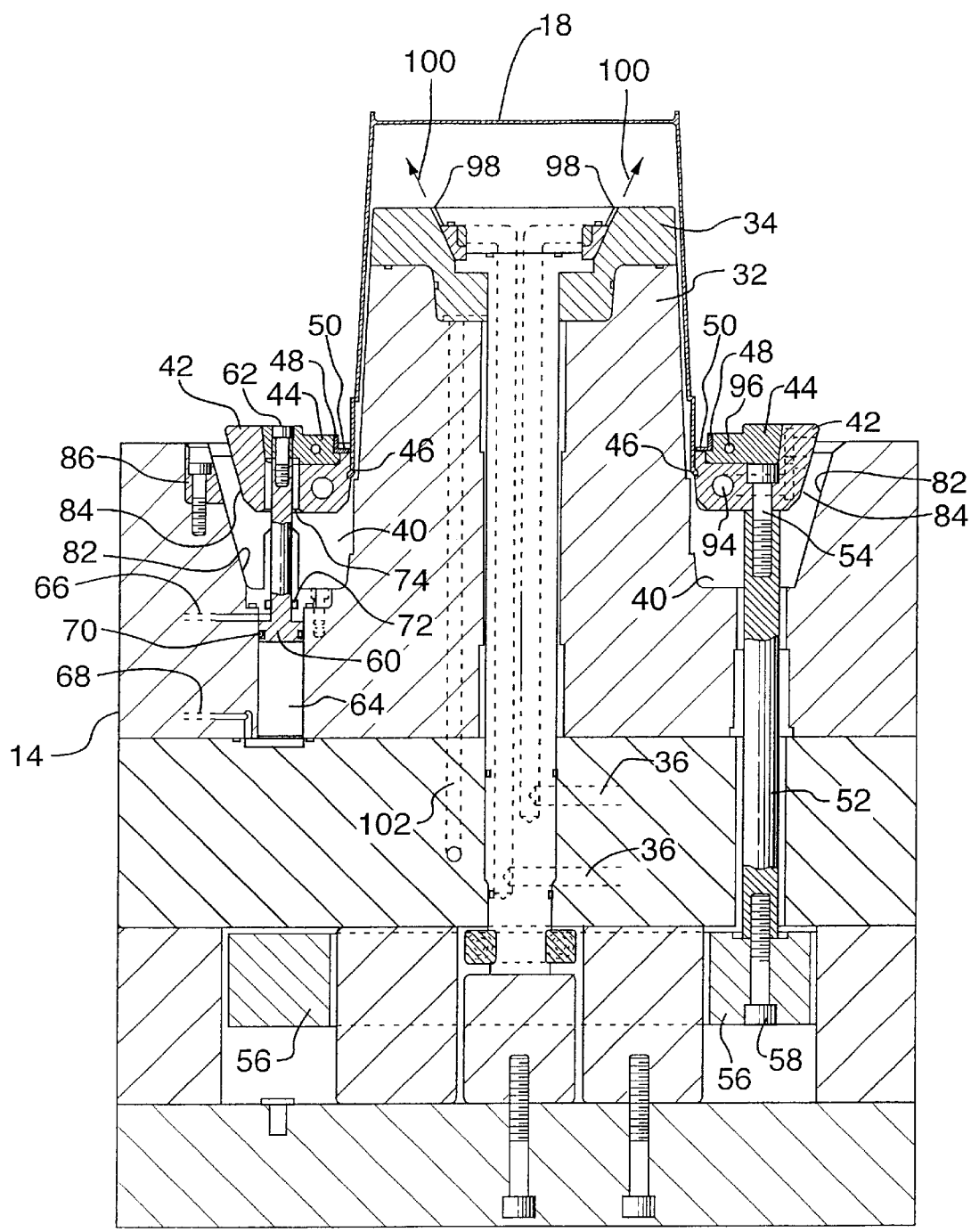
FIG. 4 is a vertical sectional view of the core portion of the mold as viewed in FIG. 1 showing the operation of the ejector rings.
Figure 5:
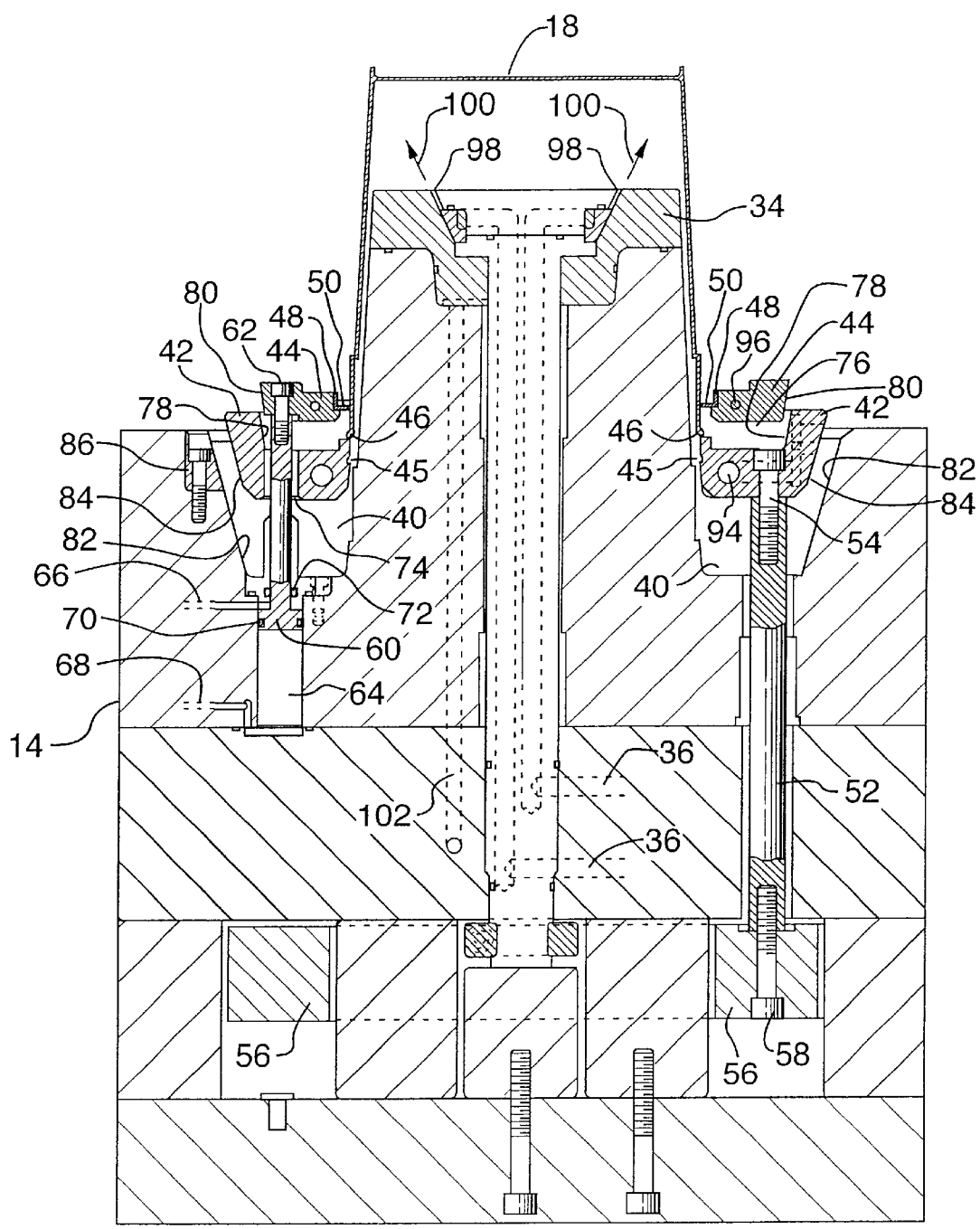
FIG. 5 is a vertical sectional view similar to FIG. 4 showing the ejector rings fully extended.
Figure 6:
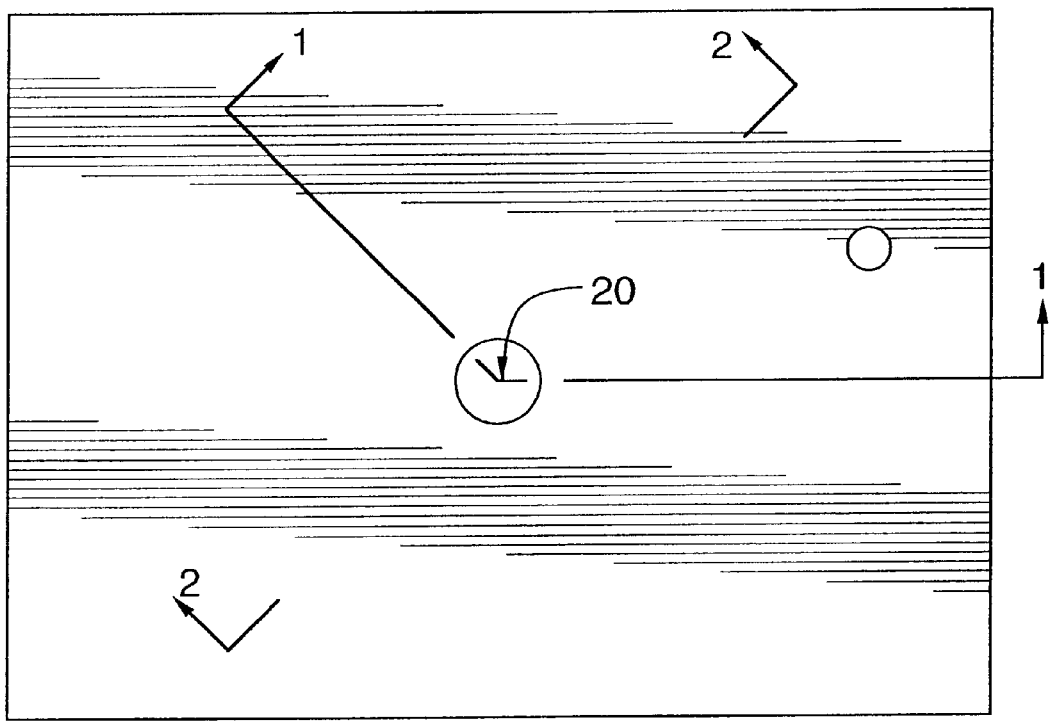
FIG. 6 is a top plan view of the preferred embodiment of the injection mold according to the present invention.

As seen best in FIGS. 1 and 3 to 5, a plurality of circumferentially spaced-apart push rods 52 are located in mold core portion 14 and are attached to inner ejector ring 42 by cap screws 54. Push rods 52 are mounted on or connected to an ejector plate 56 and held in position by cap screws 58. Ejector plate 56 moves up and down in core portion 14 by a lever and cam arrangement or hydraulic cylinders (not shown) that operate as mold 10 opens as will be described further below. FIGS. 1 and 2 show ejector plate 56 in its lower position, and FIGS. 4 and 5 show ejector plate 56 in its upper position. Push rods 52 are axially movable in mold core portion 14, as is ejector plate 56 and inner ejector ring 42. Push rods 52 and ejector plate 56 form axially movable first push rod means connected to inner ejector ring 42 for moving inner ejector ring 42 outwardly (upwardly as seen in FIG. 1) to partially eject a molded container 18 from mold core portion 14 upon opening of the mold.

A plurality of circumferentially spaced-apart pistons 60 are connected to outer ejector ring 44 by cap screws 62. Pistons 60 are located in cylinders 64 formed in core portion 14. Pneumatic lines 66,68 actuate pistons 60 as will be described further below. Appropriate seals 70,72 are provided for pistons 60. As seen best in FIG. 3, pistons and cylinders 60,64 are circumferentially spaced apart and located respectively between push rods 52. As seen best in FIGS. 4 and 5, inner ejector ring 42 is formed with a plurality of axially orientated clearance holes 74 formed therein to accommodate outer ejector ring pistons 60 passing therethrough. Pistons and cylinders 60, 64 form axially movable second push rod means connected to outer ejector ring 44 for moving outer ejector ring 44 outwardly (or upwardly as seen in FIGS. 1, 4 and 5) relative to inner ejector ring 42 to complete the ejection of a molded container 18 from mold core 14 as will be described further below. Pneumatic lines 66,68 form fluid actuation means for moving pistons 60 in cylinders 64.

As seen best in FIG. 5, inner ejector ring 42 defines an annular trough 76 for accommodating outer ejector ring 44. Trough 76 has a tapered side wall 78, and outer ejector ring 44 has a mating tapered sidewall 80 for mating locking engagement of outer ejector ring 44 to inner ejector ring 42. Similarly, core portion trough 40 has a tapered sidewall 82 and inner ejector ring 42 has a tapered sidewall 84 for mating locking engagement therebetween to lock inner ejector ring 42 in core portion trough 40.

As seen best in FIGS. 2 and 3, mold core portion 14 has two pairs of opposed locking or clamping wedges 86, 88 which engage respective clamping wedges 30 on mold cavity portion 12 to lock the mold cavity and core portions 12,14 together for the molding operation. Also as seen best in FIG. 1, cooling lines 90,92 are provided for cooling ejector rings 42,44 and for this purpose ejector rings 42,44 have respective cooling passages 94,96 (see FIGS. 4 and 5).

In operation, with mold 10 closed as indicated in FIG. 1, plastic is injected through sprue 20 to form container 18. The mold is then opened as indicated in FIG. 2. As mentioned above, as mold 10 opens, ejector plate 56 is raised or moved upwardly as seen in FIG. 4 causing inner ejector ring 42 to move upwardly or outwardly to the position shown in FIG. 4. It will be appreciated that as inner ejector ring 42 moves upwardly or outwardly, this also causes outer ejector ring 44 to move upwardly or outwardly. This outward movement of outer ejector ring 44 also causes pistons 60 to rise up to the position shown in FIG. 4, and for this reason, pistons 60 are said to float during the first stage of ejection of container 18. It will also be appreciated that the upward or outward movement of ejector rings 42,44 acting on container flange 50 causes the container to be lifted off boss portion 32 of mold core 14. To assist this ejection, jets of air are forced through openings 98 as indicated by arrows 100. Air is supplied to openings 98 through air line 102.

To complete the ejection of container 18, pneumatic pressure is applied to cylinders 64 to cause pistons 60 to move upwardly or outwardly causing outer ejector ring 44 to move upwardly or outwardly to the position shown in FIG. 5. The separation of ejector rings 42 and 44 by pistons 60 causes the container rim 46 to be extracted from annular groove 45 in inner ejector ring 42. The air jets 100 then complete the removal of container 18 from mold core portion 14. At this point, pistons 60 are retracted, ejector plate 56 is retracted or lowered and the molding cycle is repeated.

Having described preferred embodiments of the invention, it will be appreciated that various modifications may be made to the structures described above. For example, the configuration of ejector rings 42 and 44 can be changed to suit the shape of a particular container to be molded in mold 10. Pistons 60 are shown to pass through inner ejector ring 42, but they could be located outside inner ejection ring 42. The ejector rings 42,44 have been shown to be mounted in mold core portion 14, but they could also be mounted in cavity portion 12. Instead of push rods 52 to raise inner ejector ring 42, pneumatic cylinders could be used for this purpose as well. Similarly, push rods could be used to raise outer ejector ring 44 instead of the piston and cylinder arrangement 60,64 described above. For the purposes of this disclosure both the push rods 52 and the piston and cylinder combinations 60,64 are considered to be push rod means for moving the ejector rings 42,44 outwardly to eject the container from the mold.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An injection mold comprising:
    a core portion and a cavity portion defining therebetween a mold cavity in the shape of a container to be molded, the container having an enlarged annular rim and an annual flange spaced therefrom;
    a one piece inner annular ejector ring located in the mold core portion, the inner ejector ring defining a portion of said enlarged annular rim;
    a one piece outer annular ejector ring coaxially located adjacent to the inner ejector ring, the outer ejector ring defining a portion of said annular flange;
    axially movable first push rod means connected to the inner ejector ring for pushing the inner ejector ring and outer ejector ring outwardly to partially eject a molded container from the mold core portion upon opening of the mold; and
    axially moveable second push rod means connected to the outer ejector ring for pushing the outer ejector ring outwardly relative to the inner ejector ring to complete the ejection of said molded container from the mold core.

2. An injection mold as claimed in claim 1 wherein the first push rod means includes a plurality of circumferentially spaced-apart push rods connected to the inner annular ejector ring and an axially moveable ejector plate connected to the push rods for the simultaneous axial movement of all of the said rods.

3. An injection mold as claimed in claim 1 wherein the second push rod means includes a plurality of pistons connected to the outer annular ejector ring, and wherein the mold core portion is formed with a plurality of cylinders for slidably mounting said pistons therein, and further comprising fluid actuation means for axially moving said pistons in said cylinders.

4. An injection mold as claimed in claim 1 wherein the mold core portion defines an annular trough for accommodating the inner annular ejector ring, said core portion trough having a tapered sidewall, the inner annular ejector ring having a tapered sidewall for mating locking engagement with the core portion trough tapered sidewall.

5. An injection mold as claimed in claim 1 wherein the inner annular ejector ring defines an annular trough for accommodating the outer annular ejector ring, said inner annular ejector ring trough having a tapered sidewall, the outer annular ejector ring having a tapered sidewall for mating locking engagement with the inner annular ejector ring trough tapered sidewall.

6. An injection mold as claimed in claim 4 wherein the inner annular ejector ring defines an annular trough for accommodating the outer annular ejector ring, said inner annular ejector ring trough having a tapered sidewall, the outer annular ejector ring having a tapered sidewall for mating locking engagement with the inner annular ejector ring trough tapered sidewall.

7. An injection mold as claimed in claim 3 wherein the inner annular ejector ring includes a plurality of axially orientated clearance holes formed therein to accommodate the outer annular ejector ring pistons passing therethrough.

8. An injection mold as claimed in claim 2 wherein the second push rod means includes a plurality of pistons connected to the outer annular ejector ring, and wherein the mold core portion is formed with a plurality of cylinders for slidably mounting said pistons therein, and further comprising fluid actuation means for axially moving said pistons in said cylinders.

9. An injection mold as claimed in claim 8 wherein the pistons and cylinders are circumferentially spaced apart and located circumferentially between the push rods of the first push rod means.

10. An injection mold as claimed in claim 3 wherein the fluid actuation means are pneumatic.

11. An injection mold as claimed in claim 1 wherein said inner annular ejector ring and said outer annular ejector ring each define a cooling passage within each said ring, each said passage extending around and within each respective said ring and communicating with a cooling line for cooling each said ring.

* * * * *